United States Patent [19]

Armand et al.

[11] Patent Number: 4,698,281

[45] Date of Patent: Oct. 6, 1987

[54] GARNET-TYPE MAGNETIC MATERIAL HIGH FARADAY ROTATION MAGNETIC FILM CONTAINING SUCH A MATERIAL AND PROCESS FOR THE PRODUCTION THEREOF

[75] Inventors: Marie-Françoise Armand, Grenoble; Jacques Daval, Meylan; Bernard Ferrand, Voreppe; Hubert Moriceau, Seyssins, all of France

[73] Assignee: Commissariat a l'Energie Atomique, Paris, France

[21] Appl. No.: 787,062

[22] Filed: Oct. 15, 1985

[30] Foreign Application Priority Data

Nov. 2, 1984 [FR] France ............................... 84 16763

[51] Int. Cl.[4] ............................................... G11B 7/24

[52] U.S. Cl. ................................ 428/692; 252/62.57; 427/127; 427/128; 427/162; 428/693; 428/697; 428/699; 428/700; 428/701; 428/702; 428/900

[58] Field of Search ............... 428/692, 693, 697, 699, 428/700, 701, 702; 252/62.56, 62.57, 62.58; 427/127, 128, 162; 428/900

[56] References Cited

U.S. PATENT DOCUMENTS

| | | | |
|---|---|---|---|
| 3,947,372 | 3/1976 | Shiwagawa et al. | 252/62.57 |
| 3,949,386 | 4/1976 | Klokholm et al. | 252/62.57 |
| 4,183,999 | 1/1980 | Ota et al. | 428/336 |
| 4,350,558 | 9/1982 | Boudot et al. | 252/62.57 |
| 4,350,559 | 9/1982 | Boudot et al. | 252/62.57 |
| 4,433,034 | 2/1984 | Gwaltieri et al. | 428/693 |
| 4,435,484 | 3/1984 | Breed et al. | 428/692 |
| 4,532,180 | 7/1985 | Ohta et al. | 428/692 |
| 4,622,264 | 11/1986 | Hosoe et al. | 428/332 |
| 4,647,514 | 3/1987 | LeCraw et al. | 428/692 |

FOREIGN PATENT DOCUMENTS

| | | |
|---|---|---|
| 2418711 | 10/1974 | Fed. Rep. of Germany . |
| 2246937 | 5/1975 | France . |

OTHER PUBLICATIONS

Randles, "Liquid Phase Epitaxial Growth of Magnetic Garnets"chapter 2 of Crystals Springer-Verlag Publishers, NY 1978, pp. 71-96.

*Primary Examiner*—George F. Lesmes
*Assistant Examiner*—William M. Atkinson
*Attorney, Agent, or Firm*—Oblon, Fisher, Spivak, McClelland, & Maier

[57] ABSTRACT

The invention relates to a magnetic material containing either one or more rare earth elements, chosen from among lutetium, thulium and ytterbium, or yttrium. It also relates to a magnetic film with a high Faraday rotation constituted by a substrate coated with an epitactic layer of a magnetic material of the aforementioned type.

The process for the production of such a magnetic film involves the deposition of a garnet film by liquid phase epitaxy on a substrate, use being made of an epitaxy bath containing gadolinium oxide, praseodymium oxide, and at least one oxide of a metal M, bismuth oxide, iron oxide, gallium oxide and/or aluminium oxide and a solvent incorporating lead oxide and boron oxide.

6 Claims, 1 Drawing Figure

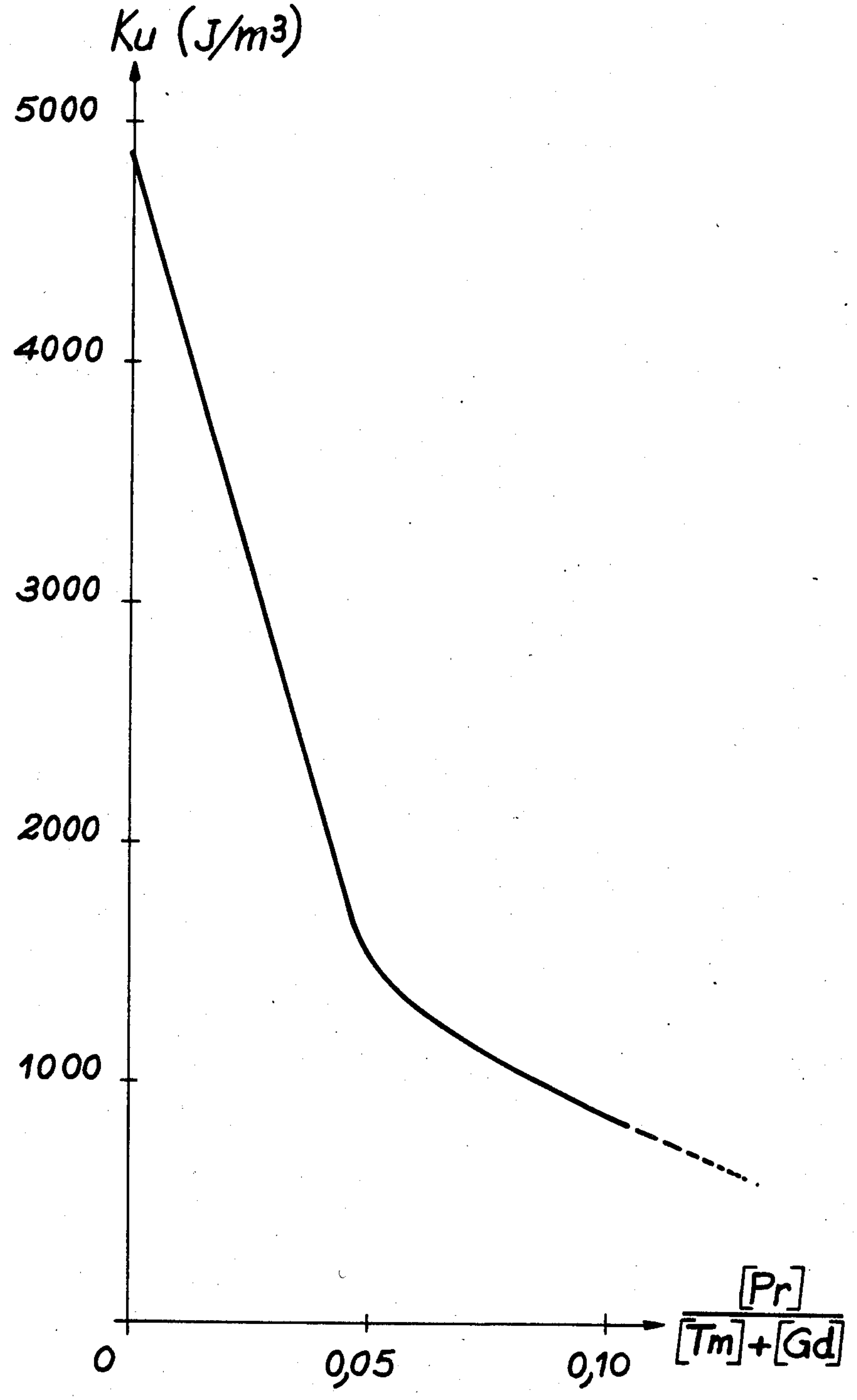
Ku (J/m3)
5000
4000
3000
2000
1000
0
0,05
0,10
[Pr] / [Tm]+[Gd]

GARNET-TYPE MAGNETIC MATERIAL HIGH FARADAY ROTATION MAGNETIC FILM CONTAINING SUCH A MATERIAL AND PROCESS FOR THE PRODUCTION THEREOF

BACKGROUND OF THE INVENTION

The present invention relates to a garnet-type magnetic material, a magnetic film with a high Faraday rotation incorporating such a material and the process for the production thereof.

More specifically it relates to the production of monocrystalline magnetic films which can be used in magneto optical devices, such as facsimile and display devices using the Faraday effect.

The principle of such devices is to obtain a brightness contrast using the Faraday effect induced on a monochromatic light on traversing a magnetic material. In such devices, use is made of a monocrystalline transparent substrate on which is deposited a ferrimagnetic garnet-type monocrystalline film in which the magnetization is normal to the plane, said film being subdivided by etching into magnetic elementary cells, whose magnetization can be oriented in one or other direction. These cells can consequently be displayed in polarized light as a result of the Faraday effect. Thus, cells oriented in one direction will appear plain, whereas the cells oriented in the other direction will appear dark. In order to use such devices for display purposes, it is consequently necessary to be able to reverse the magnetization direction in each of the elementary cells by appropriate means. Hitherto, two procedures have been proposed for achieving this result.

Accoding to a first procedure, the magnetization direction is reversed by a thermomagnetic effect using a localized heating pulse on the cell in question, as described by B. Nill, K. P. Schmidt, "Fast switchable magneto-optic memory display contents, " *Philips J. Res.* 33 211 (1978);

P. Hansen, B. Hill, W. Tolksdorf, "Optical switching with bismuth substituted iron garnets, " *Philips Tech. Rev.* Al, 33, 1984 and in European Pat. No. 00 23 063, filed on July 9, 1980 by Philips.

According to a second procedure, the result is achieved by a magnetic effect by the selective activation in the presence of a polarization field of thin conductors deposited on the magnetic film or layer in the form of two lattices, which are independent and perpendicular and which surround the elementary magnetic cells. The use of this procedure is in particular described in the following documents:

G. R. Pulliam, W. E. Ross, B. MacNeal, R. F. Bailey, "Large stable magnetic domains", *J.A.P.* 53, 2754 (1982).

L. Waller, "Compact displays—do it with magnetics", *Electronics,* Mar. 24, 1983, 51.

M. F. Shone, V. R. K. Murphy, R. F. Belt, "Growth and magnetic properties of bismuth films for magneto-optic devices", *IEEE* (*Trans on Mag*) *MAG* 18 no. 6, pp. 1307–1309 (1982).

In each of these procedures, the magnetic material used for producing the film must have very precise characteristics, but the latter differ as a function of whether the thermomagnetic or magnetic effect is used.

Thus, in the case of the thermomagnetic effect, the inversion of the magnetization direction is obtained by the application of a polarization field associated with a heating pulse localized on certain cells. Therefore the material must have a compensation temperature close to ambient temperature in order that the action of the external field applied is zero on the unheated cells, which occurs when in the vicinity of the compensation temperature, where the resultant of the magnetizations of the sublattices of the garnet structure is cancelled out and brings about a zero action of an external field. However, the magnetic cells which would have been raised to a higher temperature will have their magnetization aligned in the direction of the simultaneously applied field and this will lead to the reversal of the magnetization direction.

Magnetic garnets liable to comply with these characteristics have the composition $(GdBi)_3(FeGaAl)_5O_{12}$.

On using the second procedure for obtaining the reversal of the magnetization direction of the magnetic film or layer cells, the switching thereof takes place with the aid of currents circulating in crossed conductors in the presence of a polarization field. In this case, the magnetic material used must have characteristics differing widely from those of materials using the thermomagnetic effect. Thus, this material must not have a compensation temperature close to ambient temperature. However it must have a weak magnetization and a not very high anisotropy. Materials having these characteristics can comply with formula $(BiTm)_3(FeGa)_5O_{12}$.

The use of the second procedure is particularly advantageous, because it makes it possible to obtain much more rapidly the reversal of the magnetization direction of the magnetic cells, which constitutes an important advantage, particularly in display means.

SUMMARY OF THE INVENTION

The present invention more specifically relates to magnetic materials with a high Faraday rotation, i.e. with a high proportion of bismuth and which can be used in devices employing said second procedure for the switching of the magnetic cells.

The magnetic material according to the invention is characterized in that it complies with formula:

$$Gd_{2-x_1-x_2}M_{x_1}Pr_{x_2}Bi_1Fe_{5-y_1-y_2}Ga_{y_1}Al_{y_2}O_{12}$$

in which M represents either one or several rare earth elements chosen from among lutetium, thulium and ytterbium, or yttrium, and $x_1$, $x_2$, $y_1$ and $y_2$ are such that:

$$0<x_1\leqq 1.5$$

$$0<x_2\leqq 0.5$$

$$0\leqq y_1\leqq 1$$

$$0\leqq y_2\leqq 1$$

provided that $y_1$ and $y_2$ are not both equal to 0 and that $y_1$ plus $y_2$ are at the most equal to 1.

Thus, the magnetic material according to the invention is a garnet of type $Gd_2Bi_1Fe_5O_{12}$, in which part of the gadolinium has been substituted by on the one hand at least one element of rare earths belonging to the group lutetium, thulium, ytterbium or by yttrium, and on the other hand by praseodymium and in which part of the iron has been replaced by a non-magnetic element, such as gallium and/or aluminium.

In this magnetic material, the presence of a high bismuth proportion makes it possible to obtain a significant increase in the Faraday rotation, as in the case of the prior art magnetic materials, particularly the material $(GdBi)_3(FeGaAl)_5O_{12}$ usuable for a switching by the first procedure. The presence of praseodymium and a second rare earth element makes it possible to modify said material so that it can be used for switching by the second procedure.

Thus, the presence either of at least one rare earth element belonging to the group lutetium, thulium and ytterbium, or yttrium makes it possible to reduce the compensation temperature to below ambient temperature. The magnetization can be adjusted through the presence of gallium and/or aluminium. The presence of praseodymium makes it possible to adjust the uniaxial magnetic anisotropy field of the material to any random value between 0 and $2.10^5.A.m^{-1}$, whilst retaining the optimized magneto optical properties of the material due in particular to the presence of bismuth, gallium and/or aluminium, as well as one or more rare earths chosen from among Lu, Tm, Yb or Y.

Generally use is made of a single rare earth element, e.g. thulium, in order to reduce the compensation temperature. When using either several rare earth elements chosen from among Lu, Tm and Yb, or Y, their respective atomic contents in the material are such that the sum of these contents corresponds to $x_1$.

In the same way, use is generally made of a single element for adjusting the magentization and the latter can in particular be gallium, $y_2$ being equal to 0 in the formula given hereinbefore.

Magnetic materials of this type can be obtained by epitaxy on a substrate. This makes it possible to obtain magnetic films with a high Faraday rotation constituted by a monocrystalline film of a magnetic material corresponding to the formula given hereinbefore and by its non-magnetic monocrystalline substrate.

In order to obtain by epitaxy a monocrystalline layer of said magnetic material, it is necessary for the substrate used for the epitaxy to have substantially the same crystal lattice constant as the magnetic material to be deposited.

To this end, it is possible to use a substrate with a large crystal mesh in accordance with the composition:

$$Gd_{3-x}Ca_xGa_{5-x-2y}Mg_yZr_{x+y}O_{12}$$

in which x and y are such that:

$$0<x\leqq 0.7$$

$$0<y\leqq 0.7$$

$$x+y\leqq 0.8$$

By appropriately choosing the values of x and y, it is possible to have substrates with a crystal lattice constant, which can vary in the range 1.247 to 1.250 nm.

For the liquid phase epitaxy deposition of the layer or film, use is made of the conventional procedure consisting of preparing an epitaxy bath from oxides of the different constituents of the film or layer to be deposited, namely a bath containing gadolinium oxide, praseodymium oxide, at least one oxide of a metal M, bismuth oxide, iron oxide, gallium oxide and/or aluminium oxide and a solvent is used for dissolving these various oxides. This solvent can in particular be a mixture of lead oxide and boron oxide.

In the bath, the quantities of the different oxides are such that they correspond to the composition of the layer which it is wished to deposit. A substrate is then introduced into the bath by rotating the same and the Td deposition temperature is regulated as a function of the Ts saturation temperature of the bath, in order to bring about the growth of a monocrystalline layer of the desired composition. The deposition temperature is generally 10° to 30° C. below saturation temperature.

For deposition, in accordance with the invention, of an epitactic layer of the material according to formula:

$$Gd_{2-x1-x2}M_{x1}Pr_{x2}Bi_1Fe_{5-y1}-y_2Ga_{y1}Al_{y2}O_{12}$$

the composition of the epitaxy bath must be closely controlled and the molar ratio $Fe_2O_3/Bi_2O_3$, PbO/-$BiO_3$ and $PbO/B_2O_3$ must comply with the following conditions:

$$\frac{[Fe_2O_3]}{[Bi_2O_3]} < 0.5;\ 1.5 < \frac{[PbO]}{[Bi_2O_3]} < 2.5$$

and $$5\ \frac{[PbO]}{[B_2O_3]} < 10$$

This makes it possible to obtain the desired magneto optical characteristics.

DESCRIPTION OF THE DRAWING AND PREFERRED EMBODIMENTS

Other features and advantages of the invention can be better gathered from reading the following description of non-limitative embodiments and with reference to the attached drawing, which is a graph representing the evolution of the anisotropy of the layer as a function of the praseodymium content of the epitaxy bath.

An epitaxy bath is prepared by mixing the following oxide quantities in a platinum crucible:

1674 g of PbO
1590 g of $BiO_3$
82 g of $B_2O_3$
218 g of $Fe_2O_3$
29 g of $Ga_2O_3$
5.2 g of $Tm_2O_3$
16.3 g of $Gd_2O_3$ and
3.5 g of $Pr_6O_{11}$ The crucible is then introduced into a furnace at a 1000° C. for several hours in order to melt the mixture. It then undergoes stirring using a platinum stirrer and the mixture temperature is brought to 950° C. Mechanical stirring is continued for 4 hours and after removing the stirrer, the temperature of the bath is dropped as rapidly as possible to 800° C.

A polished substrate of composition $(GdCa)_3$-$(GaMgZr)_5O_{12}$ with 111 orientation and a diameter of 5.08 cm, as well as a thickness of 500 μm is horizontally immersed in the bath, which undergoes a rotary movement at a speed of 80 r.p.m. After 20 minutes, the substrate-magnetic layer assembly is removed from the non-rotating bath. It then undergoes a rotary movement accelerated to 900 r.p.m. in order to eject by centrifuging the remainder of the solvent and it is finally removed from the furnace.

Under these conditions, a uniform monocrystalline epitactic layer of thickness 6 μm is obtained on each face of the substrate. The epitactic layer is in accordance with the composition $Bi_1Gd_{1.4}Tm_{0.4}Pr_{0.2}Fe_{4.5}Ga_{0.5}O_{12}$ and its magnetic characteristics are given in the attached table. It also has a Faraday rotation $\theta_f$ of 1,750,000°/m measured at a wavelength of 632.8 nm and an absorption $\alpha$ of 100,000/m at said same wavelength.

The table shows for comparison purposes, the optical and magnetic properties of a prior art film, in which the epitactic layer complies with the formula $Bi_{0.6}Tm_{2.4}Fe_{3.8}Ga_{1.2}O_{12}$ and the substrate complies with the formula $Gd_3Ga_5O_{12}$.

On the basis of the results given in the table, it is clear that the film according to the invention has better magneto optical properties than the prior art film, particularly a much higher specific Faraday rotation and a higher figure of merit $M_2=2\theta_f/\alpha$. Moreover, its saturation magnetic induction and uniaxial anisotropy field characteristics make it usable in devices employing the second procedure for obtaining a reversal of the magnetization direction.

Other magnetic films are prepared in the same way by solely modifying the contents of the praseodymium oxide, thulium oxide and gadolinium oxide of the baths to check the influence of the praseodymium content on the properties of the film obtained.

The characteristics of the films obtained are also determined under these conditions. The results obtained are given in the attached drawing, which is a graph showing the variation of the anisotropy constant of the film Ku, as a function of the molar ratio: $[Pr_6O_{11}]/[[Tm_2O_3]+[Gd_2O_3]]$ of the epitaxy bath. This ratio is designated on the drawing $$\frac{[Pr]}{[Tm]+[Gd]}$$

In order to produce this graph, the anisotropy constant Ku has been determined on the basis of the following formula:

$$Ku=\frac{H_k \cdot M_s}{2}$$

in which $H_k$ represents the uniaxial anistropy field and $M_s$ the saturation magnetic induction, in order to take account of the saturation magnetic induction value, which can vary between individual films.

It is clear from the graph that the anisotropy constant of the film decreases greatly on increasing the praseodymium content of the bath and consequently the praseodymium content of the film.

It can be seen that despite their different praseodymium, thulium and gadolinium contents, the films obtained all have a Faraday rotation measured at 6328 Å (632.8 nm) of approximately 17,500°/cm.

TABLE

| SUBSTRATE/EPITAXIAL LAYER | | PRIOR ART $Gd_3Ga_5O_{12}$ $Bi_{0.6}Tm_{2.4}Fe_{3.8}Ga_{1.2}O_{12}$ | INVENTION $(GdCa)_3(GaMgZr)_5O_{12}$ $Bi_1Gd_{1.4}Tm_{0.4}Pr_{0.2}Fe_{4.5}Ga_{0.5}O_{12}$ |
|---|---|---|---|
| Saturation magnetic induction | Ms | 0.0013 Tesla | 0.0015 Tesla |
| Uniaxial anistropy magnetic field | Hk | $1.03 \cdot 10^5$ A/m | $1.07 \cdot 10^5$ A/m |
| Compensation temperature | θ comp. | < −70° C. | < −50° C. |
| Curie temperature | θ Curie | 140° C. | 220° C. |
| Specific Faraday rotation at 632.8 nm | $\theta_f$(632.8 nm) | 700,000°/m | 1,750,000°/m |
| Absorption at 632.8 nm | α (632.8 nm) | 80,000/m | 100,000/m |
| Figure of merit | $\frac{2\theta f}{\alpha}$ (632.8 nm) | 17.5 | 35 |
| Variation between the lattice constants of the substrate and the layer | $\Delta a = a_s - a_c$ | −0.0007 nm | −0.001 nm |

What is claimed is:

1. A magneto-optic device comprising, on a substrate, a magneto-optic material of the formula:

$$Gd_{2-x_1-x_2}M_{x_1}Pr_{x_2}Bi_1Fe_{5-y_1-y_2}Ga_{y_1}Al_{y_2}O_{12}$$

in which M represents at least one rare earth element selected from the group consisting of lutetium, thulium, ytterbium, and yttrium and $x_1$, $x_2$, $y_1$ and $y_2$ are such that:

$$0<x_1<1.5$$

$$0<x_2<0.5$$

$$0\leqq y_1<1$$

$$0\leqq y_2 1$$

provided that $y_1$ and $y_2$ are not both equal to 0 and that $y_1+y_2$ is at most equal to 1, wherein the compensation temperature of the magneto-optic material is below ambient temperature, the uniaxial magnetic anisotropy field is between 0 and $2\times10^5$ A/m and the specific Faraday rotation at 6238 Angstroms is about 1,750,000°/m.

2. The magneto-optic device of claim 1, wherein M is thulium.

3. The magneto-optic device of claim 1 wherein $y_2$ is 0.

4. The magneto-optic device of claim 1, wherein the magneto-optic material is of the formula:

$$Bi_1Gd_{1.4}Tm_{0.4}Pr_{0.2}Fe_{4.5}Ga_{0.5}O_{12}.$$

5. The magneto-optic device of claim 1, wherein the substrate has the composition:

$$Gd_{3-x}Ca_xGa_{5-x-2y}Mg_yZr_{x+y}O_{12}$$

in which x and y are such that:

$$0<x\leqq 0.7$$

$$0<y\leqq 0.7$$

$x+y \leqq 0.8.$

6. A process for the production of the magneto-optic device of claim 1, comprising: depositing on a substrate by liquid phase epitaxy a garnet film of the formula:

$$Gd_{2-x_1-x_2}M_{x_1}Pr_{x_2}Bi_1Fe_{5-y_1-y_2}Ga_{y_1}Al_{y_2}O_{12}$$

wherein M, $x_1$, $x_2$, $y_1$ and $y_2$ are as defined in claim 1, from an epitaxy bath incorporating:

(1) gadolinium oxide,
(2) praseodymium oxide,
(3) at least one oxide of a metal M,
(4) bismuth oxide,
(5) iron oxide,
(6) gallium oxide and/or aluminum oxide, and
(7) a solvent incorporating lead oxide and boron oxide, wherein the composition of said bath is such that the molar ratios $Fe_2O_3/Bi_2O_3$, $PbO/Bi_2O_3$ and $PbO/B_2O_3$ are in accordance with the following conditions:

$$\frac{[Fe_2O_3]}{[Bi_2O_3]} < 0.5;\ 1.5 < \frac{[PbO]}{[Bi_2O_3]} < 2.5$$

and $$5\ \frac{[PbO]}{[B_2O_3]} < 10$$

* * * * *